Feb. 4, 1958    R. L. BURKE    2,822,190
LATCHED PIPE COUPLING HAVING SLANTED LATCH HOLDING BAND
Filed May 26, 1955
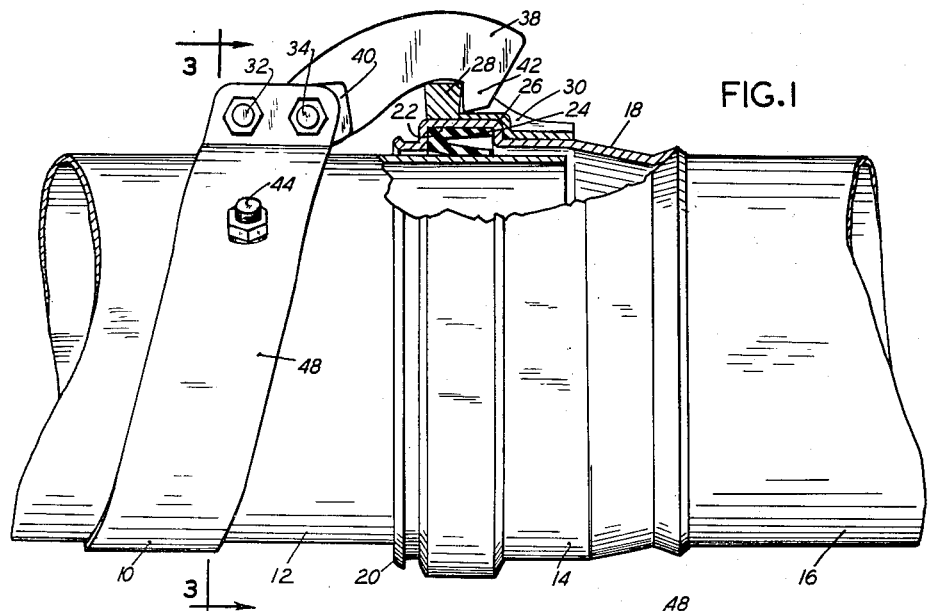
FIG.1
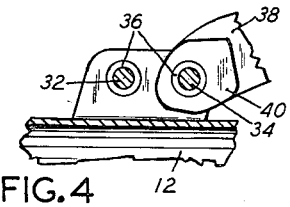
FIG.4
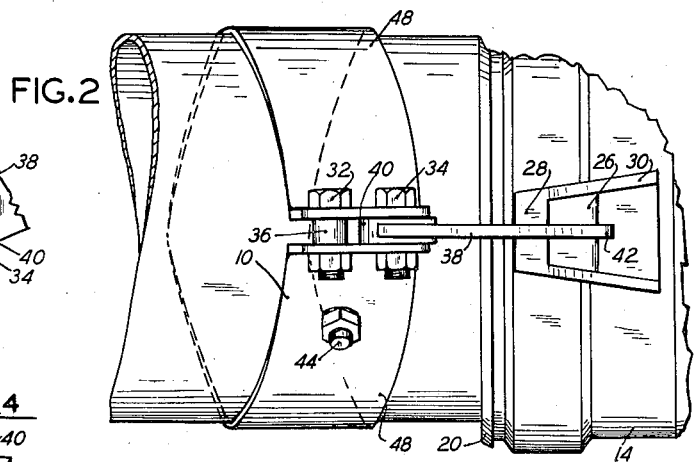
FIG.2
FIG.3
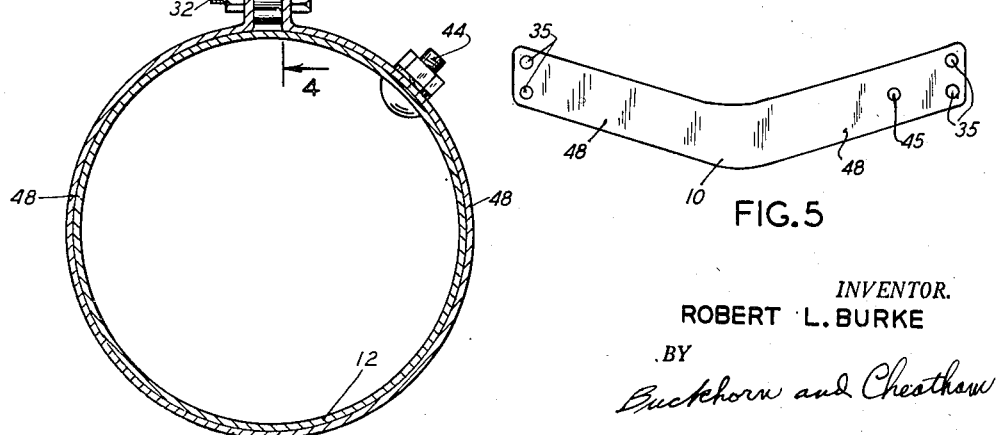
FIG.5
INVENTOR.
ROBERT L. BURKE
BY
Buckhorn and Cheatham
ATTORNEYS

United States Patent Office 2,822,190
Patented Feb. 4, 1958

2,822,190

LATCHED PIPE COUPLING HAVING SLANTED LATCH HOLDING BAND

Robert L. Burke, Riverdale, N. J., assignor to Irrigation Equipment Co., Inc., Eugene, Oreg., a corporation of Oregon Application May 26, 1955, Serial No. 511,275

2 Claims. (Cl. 285—5)

This invention relates to a pipe coupling, and more particularly to a coupling of the quick detachable type having connecting elements positioned eccentrically of the coupled pipes for resisting endwise separation thereof, in which coupling the forces transmitted by such connecting elements are more uniformly distributed to the pipes than is the case in prior devices.

The pipe coupling of the present invention has particular utility in the field of transportable irrigation conduits. Such conduits usually include a plurality of lengths of pipes connected end to end and made of lightweight aluminum alloy. The pipes will, in general, range from two to eight inches in diameter and up to forty feet in length. They have relatively thin walls so that the individual pipes are light in weight. The various pipes are also provided with upstanding sprinkler heads spaced therealong and are frequently moved in order to irrigate different portions of the field or to irrigate different fields. Joints of the quick detachable type are therefore provided in order to enable the pipes to be readily separated and moved to a different location where they are again connected. Such quick detachable connections usually include telescoping pipe end portions, i. e., they include an end bell on one end of one of the pipes fitting over an end of the other pipe. Also, the pipes are usually connected together by means of eccentrically positioned connecting elements, i. e., elements on the outer walls of the pipes at one circumferential position only. The forces tending to separate the pipes due to water pressure in the pipes, as well as those due to uneven terrain, may be quite large, i. e., several hundred pounds, or even several thousand pounds for the larger size pipes. The end bell may be of sufficiently rigid construction to absorb the eccentrically applied forces resisting separation of the pipes, particularly since it is reinforced by the telescoping end of the other pipe. Difficulty has been encountered, however, in satisfactorily attaching a connecting element to the end of the pipe not having the end bell. It has been attempted to attach a support for a connecting element to the end of such pipe by riveting, bolting or welding, but such supports heretofore employed either tear out of the thin wall of the pipe, deleteriously bend, or distort the end of the pipe. It has also been proposed to employ a support for the connecting element in the form of a clamping band extending circumferentially around the end of the pipe and having its edges in planes normal to the axis of the pipe. In attempting to use such a band, it has been found that the forces above referred to cause the band to cant on the pipe so that it no longer fits the exterior of the pipe but crushes and distorts the pipe.

In accordance with the present invention, it has been found that the difficulties referred to can be overcome by employing a band which is formed to fit the exterior of the pipe while at the same time providing an initial cant on the pipe, i. e., the band slants away from the end of the pipe from the point of attachment to the connecting member. Such a band is of chevron shape when flattened, and when in position on the pipe may be considered to have opposite side portions which are of approximate helical form having opposite helical angles. It has been found that such a band more uniformly distributes the stress from the eccentrically positioned connecting elements to the end of the pipe so that crushing or distortion of such end is eliminated.

It is therefore an object of the present invention to provide an improved pipe coupling for lightweight, thin-walled pipes in which a force preventing separation of telescoping ends of such pipes is more uniformly distributed from coupling elements positioned eccentrically of the pipes.

Another object of the invention is to provide an improved coupling for distributing stress to the end of a thin-walled pipe from eccentrically positioned coupling elements adjacent the wall of the pipe and preventing endwise separation of such pipe from another pipe having an end in telescoping relation therewith.

A further object of the invention is to provide a coupling for distributing stress to the end of a thin-walled metal pipe in which a band encircles the pipe near one end thereof and slants away from such end of the pipe from the point of attachment of a connecting element adjacent the outer wall of the pipe.

Other objects and advantages of the invention will appear in the following description thereof given in connection with the attached drawing of which:

Fig. 1 is a side elevation, with parts broken away, of the pipe coupling of the present invention;

Fig. 2 is a plan view of a portion of the device of Fig. 1;

Fig. 3 is a vertical section through one of the pipes takes along line 3—3 of Fig. 1 with the other pipe omitted;

Fig. 4 is a fragmentary vertical section taken on the line 4—4 of Fig. 3; and

Fig. 5 is a view, on a smaller scale, showing the shape of the coupling band when in flattened condition.

Referring more particularly to the drawings, the coupling band 10 of the present invention is shown in position on the end of a thin-walled pipe 12, the pipe 12 being received within an end bell 14 secured to the end of another pipe 16, for example, by welding. The end bell 14 has a tapered portion 18 which increases in diameter toward the open end of the end bell, the internal diameter of such end bell adjacent its open end being sufficiently large to receive the end of the pipe 12. The end bell 14 has a flared flange portion 20 surrounding its open end to serve as a guide for inserting the end of the pipe 12 and is also provided with an internal annular groove 22 for receiving a suitable gasket 24 which may, for example, be of the conventional chevron type. The end bell 14 has secured to its outer surface a suitable catch member 26 provided with a latch engaging portion 28 and guiding and reinforcing side portions 30, the catch member 26 being secured to the end bell in any desired manner, for example, by welding. The band 10 has its ends bent outwardly and secured together by bolts 32 and 34 extending through holes 35 (Fig. 5) therein, the bolts having suitable spacers 36 positioned thereon between the ends of the band 10. A latch member 38 has one end pivotally mounted on the spacer 36 on the bolt 34. The pivoted end of the latch member has a thickened bearing and guiding portion 40, and the other end thereof has a hook portion 42 engaging the latch engaging portion 28 of the catch member 26. In order to prevent accidental displacement of the band 10 along the pipe 12, the band 10 is preferably held in position adjacent the end of the pipe 12 by a bolt 44 extending through a hole in the pipe 12 and a hole 45 (Fig. 5) in the band, the bolt 44 being preferably spaced approximately forty-five degrees circumferentially from the ends of the band 10.

It will be apparent that the engagement of the hook portion 42 of the latch member 38 with the latch engaging portion 28 of the catch member 26 will prevent endwise separation of the pipes due to water pressure within the pipes or any other stress tending to cause separation of the pipes. The two pipes can readily be disconnected from each other, for example, by lifting the latch member 38, such latch member usually being maintained on top of the pipes when the pipes are being employed for irrigation so that gravity tends to hold the latch member 38 in latching position. The usual way of disconnecting the pipes, however, is to push the pipe 12 further into the end bell 14 of the pipe 16 to cause the latch engaging portion 28 of the catch member 26 to cam the latch member 38 upwardly so that its hook portion will clear the guiding and reinforcing portions 30 of the catch member 26 when the pipes are rotated relative to each other. The pipe 12 is then rotated relative to the end bell 14 until the hook portion 42 of the latch member is circumferentially displaced from the catch member 26. The end of the pipe 12 may then be pulled out of the end bell 14. The pipes may be again connected by merely inserting the end of the pipe 12 within the end bell 14 when the latch member 38 is in alignment with the catch member 26. Movement of the end of the pipe 12 into the end bell 14 causes the latch engaging portion 28 of the catch member 26 to cam the end of the latch member 38 outwardly, after which the hook portion 42 of the latch member 38 drops into the position shown in Fig. 1 to again connect the pipes.

It will also be apparent from the drawings that the connecting elements which transmit the stress resisting separation of the pipes are positioned eccentrically of the pipes at one circumferential location only. This means that such stresses are applied to the pipes along a line which is eccentric to the axis of the pipes. The end bell 14 may be of sufficiently heavy construction to resist such eccentrically applied stresses and, furthermore, the formation of the annular groove 22 therein provides a stiffening rib. Also, the end of the pipe 12 within the end bell 14 provides a reinforcing action for the end bell as long as the end of the pipe 12 is not distorted. The eccentrically applied stresses are, in general, absorbed by the end bell 14 without substantial distortion thereof.

Attachment of a pivotal mounting or support for the latch member 38, by riveting, bolting or welding, or similar expedients, to the end of the pipe 12 has not proved satisfactory as the support either tears the end of a thin-walled pipe or distorts or crushes it. A circumferential band extending around the pipe so as to have its edges in planes normal to the axis of the pipe 12 has also not proved satisfactory, as such band, in transmitting stress to the pipe, cants on the pipe and also distorts or crushes the end of the pipe. A band of the type shown at 10, however, has been found to sufficiently uniformly distribute the stress to the end of the pipe 12 that no substantial distortion or crushing takes place. The shape of the band 10 when flattened is shown in Fig. 5 and may be described as being substantially chevron-shaped. When bent into a band encircling the pipe 12, the band 10 is initially canted, i. e., it is slanted away from the end of the pipe 12 from the point of connection to the connecting element such as the latch member 38. The side portions 48 of the band are each approximately helical in form but are of opposite helix angle. The helix angles, i. e., the angles which the edges of the side portions of the band make with a plane normal to the axis of the pipe 12, may vary within a considerable range. A suitable helix angle for most bands is 15° and it is to be noted that this is the same angle which the arms of the flattened band of Fig. 5 make with a line drawn through corresponding points in the two ends of the band.

In any event, it is preferred that the width of the band and the pitch of the helix be correlated such that there is an overlapping relationship between the ends of the band and the portion of the band opposite the ends of the band. That is to say, the width and slant of the band are preferably such that there is a plane normal to the axis of the pipe 12 which is within the axial extent of the band at all portions of the band, for example, the plane of the section line 3—3 of Fig. 1. Under such conditions, the band has a cylindrical inner surface which snugly engages the end of the pipe 12 when the bolts 32 and 34 are tightened, and the band will not loosen on the pipe by canting such as would be the case if the plane referred to does not fall within the limits just mentioned.

The width of the band will also vary within considerable limits, depending to a considerable extent upon the diameter of the pipe with which the band is employed. Thus, the width of the band may vary from approximately eight-tenths the diameter of the pipe for small diameter pipes to approximately three-tenths the diameter of the pipe for pipes of larger diameter. For irrigation pipes made of thin-walled aluminum alloy, for example, pipes having wall thicknesses of one-eighth inch, the thickness of the band may also be approximately one-eighth inch, although such thickness may vary with the size of the pipe. While the band 10 is shown as having its ends held together by two bolts 32 and 34, it is apparent that any suitable number of bolts can be employed, for example, one bolt for pipes of small diameter with which narrower bands are employed or three or more bolts for pipes of greater diameter with which bands of greater width are employed. With any of the bands of the present invention, the stress from the connecting elements which resists separation of the pipes causes the band to tighten on the end of the pipe 12 and the stress is frictionally transmitted to the pipe through relatively large pressure areas such that crushing or other distortion of the end of the pipe does not occur.

While the coupling band of the present invention has been described with respect to a pipe coupling for thin-walled irrigation pipes, it will be apparent that the band has utility wherever it is desired to distribute an eccentrically applied load to a cylindrical member in the direction of its axis.

I claim as my invention:

1. In combination with a pair of thin-walled pipes having coaxially positioned telescoping pipe ends, the inner telescoping pipe end being loosely positioned within the outer telescoping pipe end to permit said pipes to flex with respect to each other, a coupling for coupling said pipe ends in said telescoped relation in a manner to minimize distortion of said pipes by said coupling when said pipes are utilized for transmitting fluid, said coupling comprising a catch member mounted on the pipe having the outer telescoping end, a latch support positioned adjacent to the pipe having the inner telescoping end and adjacent to said catch member, a latch member pivotally mounted on said latch support and extending to and engaging said catch member, and a coupling band supporting said latch support and extending around and snugly fitting the exterior of the pipe having the inner telescoping end, said band having a uniform width in a direction axially of the pipe encircled thereby in the range between three-tenths and eight-tenths of the diameter of said encircled pipe, said latch member pivotal mounting being positioned closer to the coaxis of said pipe ends than in said catch member and being positioned closely adjacent to the edge of said coupling band which is nearest to the outer telescoping pipe end, and said coupling band slanting away from said latch member pivotal mounting at an angle of approximately fifteen degrees to a line passing through said latch member pivotal mounting and perpendicular to the axis of the pipe encircled by said band, said line lying between the portion of said band which is circumferentially opposite to said latch member pivotal mounting and said outer telescoping pipe end.

2. In combination with a pair of thin-walled pipes having coaxially positioned telescoping pipe ends, the inner telescoping pipe end being loosely received within the outer telescoping pipe end to permit said pipes to flex with respect to each other, a coupling according to claim 8 for coupling said pipe ends in said telescoped relation in a manner to minimize distortion of said pipes by said coupling when said pipes are utilized for transmitting fluid, said coupling including a rigid member extending through the wall of the pipe having the inner telescoping end and through the coupling band to prevent the coupling band from twisting circumferentially with respect to the pipe encircled thereby.

References Cited in the file of this patent

UNITED STATES PATENTS

| | | |
|---|---|---|
| 618,473 | Lambert | Jan. 31, 1899 |
| 2,459,644 | Heidebrecht | Jan. 18, 1949 |
| 2,621,061 | Beymer | Dec. 9, 1952 |
| 2,675,254 | Davis | Apr. 13, 1954 |